(12) United States Patent
Noyori et al.

(10) Patent No.: US 7,891,715 B2
(45) Date of Patent: Feb. 22, 2011

(54) SHOCK ABSORBING STRUCTURE FOR VEHICLE

(75) Inventors: Keisuke Noyori, Toyota (JP); Kuniaki Hasegawa, Kariya (JP); Yoshihiro Ogura, Toyota (JP); Soshi Mitsuyama, Toyota (JP); Takahisa Shiraoka, Nishikamo-Gun (JP)

(73) Assignees: Kojima Press Industry Co., Ltd., Toyota-Shi (JP); Toyota Jidosha Kanushiki Kaisha, Toyota-Shi (JP)

( * ) Notice: Subject to any disclaimer, the term of this patent is extended or adjusted under 35 U.S.C. 154(b) by 175 days.

(21) Appl. No.: 12/269,113

(22) Filed: Nov. 12, 2008

(65) Prior Publication Data

US 2009/0134641 A1    May 28, 2009

(30) Foreign Application Priority Data

Nov. 26, 2007    (JP) .............................. 2007-304105

(51) Int. Cl.
  *B60R 19/18*    (2006.01)
(52) U.S. Cl. .............. 293/121; 296/187.09; 296/187.04
(58) Field of Classification Search ............ 296/187.03, 296/187.04, 187.09, 187.1; 293/107, 109, 293/110, 120, 121, 132, 133, 134
  See application file for complete search history.

(56) References Cited

U.S. PATENT DOCUMENTS

| 6,726,262 | B2 * | 4/2004 | Marijnissen et al. | ........ 293/121 |
| 6,874,832 | B2 * | 4/2005 | Evans et al. | .................. 293/120 |
| 6,923,494 | B2 * | 8/2005 | Shuler et al. | ........... 296/187.05 |
| 7,188,876 | B2 * | 3/2007 | Jaarda et al. | ................. 293/133 |
| 7,533,927 | B2 * | 5/2009 | Ito et al. | ................. 296/187.03 |
| 2004/0036302 | A1 * | 2/2004 | Shuler et al. | ................. 293/120 |
| 2004/0066048 | A1 | 4/2004 | Mooijman et al. | |
| 2005/0057053 | A1 | 3/2005 | Evans et al. | |
| 2007/0200375 | A1 | 8/2007 | Ito et al. | |
| 2007/0200376 | A1 * | 8/2007 | Jaarda et al. | ................. 293/120 |
| 2009/0159384 | A1 * | 6/2009 | Chitteti et al. | .............. 188/377 |
| 2009/0206618 | A1 * | 8/2009 | Ralston et al. | .............. 293/120 |

FOREIGN PATENT DOCUMENTS

| JP | 2001-354092 A1 | 12/2001 |
| JP | 2005-104164 A1 | 4/2005 |
| JP | 2005-510393 A1 | 4/2005 |
| JP | 2005-536392 A1 | 12/2005 |
| JP | 2007-223515 A1 | 9/2007 |
| WO | 03/022638 A1 | 3/2003 |
| WO | 03/037688 A1 | 5/2003 |

* cited by examiner

*Primary Examiner*—Patricia L Engle
(74) *Attorney, Agent, or Firm*—Burr & Brown

(57) ABSTRACT

A shock absorbing structure for a vehicle including a top wall to which a shock is to be applied and two side walls integrally formed with the top wall and extending from the top wall such that the side walls are opposed to each other, thereby forming an angular U-shaped cross section. The side walls have a waveform in which convex portions and concave portions are alternately and continuously provided. In addition, a bottom plate is integrally formed with an end portion of the respective side walls. The shock absorbing structure further includes a first window portion that is formed over a portion of the each side wall including a part of a bottom portion and parts of opposite side portions of the concave portions and a portion of the bottom plate that is connected to the bottom portion and that is positioned between the opposite side portions.

12 Claims, 10 Drawing Sheets

SHOCK ABSORBING STRUCTURE FOR VEHICLE

The present application is based on Japanese Patent Application No. 2007-304105 filed on Nov. 26, 2007, the contents of which are incorporated herein by reference.

BACKGROUND OF THE INVENTION

1. Field of the Invention

The present invention relates to a shock absorbing structure for a vehicle. More particularly, the invention relates to a shock absorbing structure for a vehicle that reduces a shock applied to a pedestrian and a vehicle passenger at the time of a contact or collision with the pedestrian or other objects, to thereby protect the pedestrian and the passenger.

2. Description of the Related Art

Conventionally, in many vehicles such as automobiles, a shock absorbing structure is disposed at a side opposite from a vehicle cabin side (a back side) of an interior component such as a pillar garnish, a roof side rail, or an instrumental panel that is more likely to contact with the head or the leg of a driver or a passenger in a vehicle collision, or disposed inside an exterior component such as a bumper that is more likely to contact with a pedestrian. Thus, the shock absorbing structure can protect a vehicle passenger, a pedestrian or the like by reducing a shock applied to them when they contact with the interior or the exterior component at the time of a collision or the like.

Various types of shock absorbing structures are conventionally well known. As one type of such a shock absorbing structure for a vehicle, there is known a shock absorbing structure (a) comprising a resin molded body having an angular U-shaped cross section parallel to a shock application direction. The resin molded body includes a top wall to which a shock is applied and two side walls formed integrally with the top wall such that the side walls extend in a shock application direction from a back surface of the top wall opposite to a surface on which the shock is applied, while being opposed to each other. The side walls are deformed by application of shock, thereby absorbing the shock (See JP-A-2005-104164, for example). Since the shock absorbing structure for a vehicle is made of the resin molded body, excellent moldability and weight reduction can be obtained. In addition, ideal load displacement characteristics represented by a rectangular waveform can be obtained by absorbing the shock via buckling deformation of the side walls.

However, in order to increase an absorbing amount of shock energy in a limited shock stroke in accordance with a size of an installation space for the structure, the above shock absorbing structure (a) generally employs a structure in which a load value in the load displacement characteristics is increased within an allowable range by allowing thickness of the side walls to be larger, for example. However, in fact, it is difficult to increase the absorbing amount of the shock energy to an expected level only by allowing the side walls to have a larger thickness. Using such thick side walls will cause an increase in weight of the shock absorbing structure. On the other hand, if the load value in the load displacement characteristics is adjusted by allowing the side walls to have a small thickness, a large scale modification is needed to modify a core or an entire surface of a cavity surface of the mold die of the shock absorbing structure that is made of the resin molded body, thus leading to a production cost increase. In short, it is not easy for the shock absorbing structure (a) that is merely made of the resin molded body having the angular U-shaped cross section to tune the load displacement characteristics such that the absorbing amount of shock energy is set to a desired amount without any increase in weight, cost, and the like.

Under such circumstances, there is proposed a shock absorbing structure for a vehicle (b) that includes a top wall and two side walls integrally formed with the top wall so as to have a basic configuration with an angular U-shaped cross section like the above conventional shock absorbing structure, and each side wall has a waveform in which convex portions protruded outwardly in opposing directions of the side walls, i.e., in directions in which the side walls are opposed to each other, and concave portions recessed inwardly in the opposing directions of the side walls are alternately and continuously arranged in a length direction of the side walls (See JP-A-2001-354092, for example). Additionally, there is proposed a shock absorbing structure for a vehicle (c) that includes a top wall; side walls having not only a waveform but also having windows and slits that are extended in a shock application direction and that are formed in protruded portions of convex portions, in bottom portions of concave portions, or in opposite side portions of the concave portions of the side walls; and a bottom plate having an outer flange-like shape that is extended outwardly in the opposing directions of the side walls and that is integrally formed with end portions of the side walls opposite from the top wall side so as to be extended over an entire length in a length direction perpendicular to the shock application direction (See U.S. Pat. No. 6,726,262 and US 2007200375, for example).

Among the conventional shock absorbing structures as above, in the shock absorbing structure (b), the side walls are waveform shaped, so that even when lengths of the side walls extended in the shock application direction are made small, the load value in the load displacement characteristics can be made sufficiently large. Moreover, strengths of the side walls can be changed, without changing the thickness of the side walls at all, by variously changing heights and depths of the convex and the concave portions of the waveform-shaped side walls. This enables the load value in the load displacement characteristics to be favorably increased or reduced. However, in order to change the heights and the depths of the convex and the concave portions of the side walls, as in the change of the thickness of the side walls, it is necessary to provide a large scale modification to the core or the entire cavity surface of a mold die. Thus, also in the shock absorbing structure (b), production cost inevitably increases due to tuning of the load displacement characteristics.

In the shock absorbing structure (c), the load value in the load displacement characteristics can be favorably increased or reduced by adjusting the size of the windows, the width and the length of the slits, and the like provided in the protruded portions of the convex portions, the bottom portions of the concave portions, or the opposite side portions of the concave portions of the side walls. In this case, there is no need to change the thickness of the side walls, the heights and the depths of the convex and the concave portions of the side walls, or the like at all. In addition, the bottom plate connects the convex portions adjacent to each other on the side walls, and also connects the side portions of each of the concave portions to each other. Thus, it can be favorably prevented that deformation strength of the entire side walls is excessively reduced by formation of the windows and the slits in the convex and the concave portions. Accordingly, unlike the case in which the thickness of the side walls, the heights and the depths of the convex and the concave portions of the side walls, or the like are changed, only a small scale modification is required to the mold die, such as a modification to only a part of the cavity surface which provides the windows and the slits, in order to increase or reduce the load value in the load displacement characteristics. Thereby, the load displacement characteristics can be surely tuned at the lowest possible cost.

However, in the shock absorbing structure (c) including the side walls having the waveform, although the above advantages can be obtained, a distance between the bottom portions of the concave portions positioned on opposite sides in the mutually opposing directions of the side walls is inevitably made small. Accordingly, when the side walls are buckled and deformed by application of a shock, the bottom portions of the concave portions can easily contact with each other. This causes a risk that the shock stroke of the side walls may be insufficient. If that happens, the absorbing amount of shock energy cannot be ensured sufficiently, even though the sizes of the slits and the windows are adjusted to tune the load displacement characteristics.

SUMMARY OF THE INVENTION

Therefore, the present invention has been made in the light of the situations described above, and an object of the invention is to provide a novel structure of a shock absorbing structure for a vehicle that enables load displacement characteristics to be surely tuned at a lowest possible cost and can stably ensure a sufficient shock stroke.

In order to achieve the object, it is a principle of the present invention to provide a shock absorbing structure for a vehicle comprising a resin molded body having an angular U-shaped cross section parallel to a shock application direction, the resin molded body comprising: a top wall to which a shock is to be applied; two side walls formed integrally with the top wall such that the side walls extend in a shock application direction from a back surface of the top wall opposite to a surface on which the shock is applied and are opposed to each other, each side wall being formed into a waveform in which a plurality of convex portions protruding outwardly in opposing directions of the side walls and a plurality of concave portions recessed inwardly in the opposing directions of the side walls are alternately and continuously formed in a length direction of each side wall; and a bottom plate extending in the length direction of the side walls perpendicular to the shock application direction and having an outer flange shape protruding outwardly in the opposing directions of the side walls, the bottom plate being integrally formed with an end portion of each side wall which is opposite to an end portion on the top wall side, wherein a first window portion is provided on at least one formation portion of the concave portion of the side walls, the first window portion extending over a portion of each side walls including a part of a bottom portion and parts of both side portions of the concave portion and a portion of the bottom plate that is connected to the bottom portion and that is positioned between the side portions.

According to a preferable aspect of the present invention, each of the plurality of convex portions has a bending portion at a middle of a protruded portion thereof in the shock application direction and the bending portion protrudes outwardly in the opposing directions of the side walls.

According to a preferable aspect of the present invention, a second window portion is provided on at least one formation portion of the convex portion of the side walls, the second window portion extending over a part of a protruded portion of the convex portion and a portion of the top wall connected to the protruded portion.

According to a preferable aspect of the present invention, each of the side walls is a plate having a plurality of projected portions that project outwardly in the opposing directions of the side walls and extend from the bottom plate toward the top wall with a predetermined length which is not enough to reach the top wall, thereby forming a planar portion on the top wall side of the side walls. The plurality of projected portions are spaced apart from each other with a predetermined distance therebetween in the length direction of the side wall, and the plurality of projected portions consist the plurality of convex portions and portions of the plate member positioned between the plurality of projected portions consist the plurality of concave portions. Accordingly, a width of the top wall is constant over the entire length thereof in the length direction.

According to a preferable aspect of the present invention, each of the side wall is formed into a rectangular waveform.

According to a preferable aspect of the present invention, the two side walls are respectively inclined away from each other outwardly in the opposing directions of the side walls as the side walls extend from the top wall toward the bottom plate.

According to a preferable aspect of the present invention, the side portions of each of the plurality of concave portions are respectively inclined away from or inclined toward each other in the length direction of the side wall as the side portions extend from the top wall toward the bottom plate.

According to a preferable aspect of the present invention, the side portions of each of the plurality of concave portions are respectively inclined away from or inclined toward each other outwardly in the opposing directions of the side walls, whereby each of the side walls defines a trapezoid waveform.

As described above, in the shock absorbing structure for a vehicle according to the present invention, a load value in load displacement characteristics can be favorably increased or reduced by adjusting the size of the first window, specifically, a length of the first window in an extending direction of the side wall, a width of a formation portion of the first window on the side portions of the concave portion in a direction perpendicular to the extending direction of the side wall, and the like, without changing the thickness of the side walls, or the height, the depth, and the like of the convex and the concave portions. Additionally, mutually adjacent convex portions sandwiching the concave portion having the first window formed therein are connected to each other by the bottom plate, so that it can be advantageously prevented that the formation of the first window excessively reduce deformation strength of the entire side walls. Therefore, like the conventional structures including windows, slits, or the like in the concave and the convex portions of the side walls, a small scale modification to a mold die can be provided to increase or reduce the load value in the load displacement characteristics. Accordingly, the load displacement characteristics can be surely tuned at a lowest possible cost.

Additionally, in the shock absorbing structure for a vehicle according to the present invention, particularly, the first window is provided in one or more or all of formation portion(s) of the concave portion of the side walls so as to straddle the portion of the each side wall including the part of the bottom portion and the parts of the opposite side portions of the concave portion and the portion of the bottom plate that is connected to the bottom portion of the concave portion and that is positioned between the opposite side portions of the concave portion. In other words, there are removed one or more or all of the portions of the side walls straddling the bottom portion and the opposite side portions of the concave portion and the portion of the bottom plate connected to the bottom portion of the concave portion and positioned between the opposite side portions of the concave portion. Thereby, there are removed one or more or all of portions that are likely to contact with each other upon buckling deformation of the side walls by application of a shock, or alternatively, the distances between those portions are favorably made large. Examples of such portions include the bottom portion of each of the concave portions positioned on the opposite sides in the mutually opposing directions of the side walls, the end portions of the side portion on a side of the bottom portion of the concave portion. Additionally, there are removed the end portions of the bottom plate that are adjacent to the bottom portions of the concave portions. Accordingly, when molding the resin molded body which serves as the shock absorbing structure for a vehicle, a mold releasing operation is advantageously facilitated, since undercut portions are eliminated.

Thus, in the shock absorbing structure for a vehicle according to the present invention, each of the side walls has the waveform in which the convex and the concave portions are continuously formed. Accordingly, although the distances between the bottom portions of the concave portions located on the opposite sides in the mutually opposing directions of the side walls are made small, when the side walls are deformed by application of a shock, there can be effectively prevented easy contact between the bottom portions of the concave portions located on the opposite sides in the opposing directions of the side walls, easy contact between end faces of the side portions connected to the bottom portions of the concave portions, and furthermore, easy contact between end faces of the bottom plate connected to the bottom portions, without complicating a molding operation.

Therefore, in the shock absorbing structure for a vehicle according to the present invention, the load displacement characteristics can be easily and surely tuned at a lowest possible cost, and a sufficient shock stroke can be stably ensured. As a result, desired shock absorbing characteristics can be very effectively and surely exhibited.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE INVENTION

Figure 1:
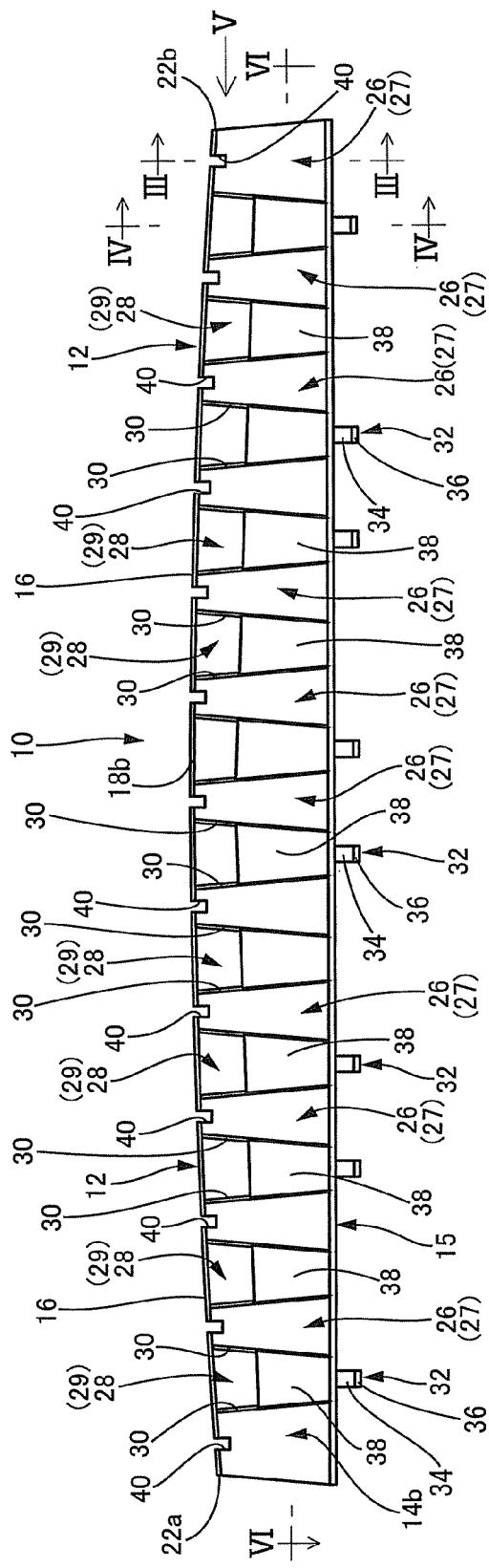
FIG. 1 is a front view of a shock absorbing structure for a vehicle according to an embodiment of the present invention.

In order to more clarify the invention, embodiments of a shock absorbing structure for a vehicle according to the present invention will be described in detail with reference to drawings.

FIGS. 1 to 4 schematically shows a front view, a plan view, and two vertical cross sectional views taken at different positions of an example of the shock absorbing structure for a vehicle according to the present invention that is to be disposed inside a front bumper of an automobile. As is apparent from those drawings, a shock absorbing structure 10 integrally includes a top wall 12, two side walls 14a and 14b, and a bottom plate 15.

More specifically, the shock absorbing structure 10, for example, is formed by a resin molded body in which the top wall 12, the two side walls 14a and 14b, and the bottom plate 15 are integrally molded by injection molding using a material such as polypropylene, polyethylene, or polybutene of an olefin synthetic resin, for example, that allows easy buckling deformation and that has an appropriate flexibility.

In the shock absorbing structure 10 formed by the resin molded body, the top wall 12 is made of a relatively thin elongate plate. The top wall 12 has two long sides 18a and 18b that are extended in a length direction of the top wall 12 (in a direction perpendicular to a shock application direction, namely, in a lateral direction in FIG. 2) and each of which has an approximately trapezoidal waveform. Accordingly, entire shape of the top wall 12 is a long, narrow, and stepped rectangular shape in which a plurality of small width portions and a plurality of large width portions are alternately and continuously provided.

One side surface of the top wall 12 in a thickness direction thereof is formed as a convex curved surface corresponding to an inner surface shape of a bumper cover of the front bumper where the shock absorbing structure 10 is to be installed. Thereby, the one side surface thereof is referred to as a shock applied surface 16 to which a shock is applied in a state where the shock absorbing structure 10 is installed inside the bumper cover, as described below. Thus, in the structure 10, a shock application direction is a direction that is perpendicular to the shock applied surface 16 of the top wall 12 and that is oriented from the shock applied surface 16 toward a back surface 17 of the top wall 12 which is on a side thereof opposite from the shock applied surface 16 (a direction indicated by arrow A in FIG. 8).

The two side walls 14a and 14b are also each made of an elongate plate having the same thickness as that of the top wall 12. The side walls 14a and 14b are extended in the shock application direction from the two long side 18a and 18b, which extend in the length direction on the back surface 17 of the top wall 12 (in the direction perpendicular to the shock application direction, namely in the lateral direction in FIG. 2), toward a side of the top wall 12 opposite from a shock applied side thereof. In other words, the side walls 14a and 14b are integrally provided with the back surface 17 of the top wall 12 so as to extend in the shock application direction while they are opposed to each other. In this case, widths of the respective side walls 14 (dimensions in a vertical direction in FIG. 1) are gradually increased toward a center portion in the length direction of the top wall 12 so as to correspond to the convex curved shape of the top wall 12. In short, the respective side walls 14 are formed so as to have heights becoming gradually larger toward the center of the length direction of the side walls 14.

In addition, each of the two side walls 14a and 14b is extended while forming a rectangular waveform in the length direction thereof, namely in the direction perpendicular to the shock application direction. In other words, the two side walls 14a and 14b are both formed by rectangular convex portions 26 protruded outwardly in mutually opposing directions of the side walls 14 and concave portions 28 recessed inwardly in the mutually opposing directions, that are alternately and continuously provided in the direction perpendicular to the shock application direction.

Then, the two side walls 14a and 14b thus formed are arranged such that protruded portions 27 having flat surfaces extended in the length directions of the respective side walls 14 in the respective convex portions 26 are opposed to each other, and bottom portions 29 having flat surfaces extended in the length directions of the respective side walls 14 in the respective concave portions 28 are opposed to each other, respectively, in the direction perpendicular to the length directions of the side walls 14a and 14b (in a width direction of the top wall 12). In addition, in the side walls 14a and 14b, side portions 30 having flat surfaces extended in opposing directions of the side walls 14a and 14b in the concave portions 28 (the convex portions 26) are opposed to each other in the length directions of the side walls 14.

The protruded portion 27 of each of the convex portions 26 is connected to each of the large width portions of the top wall 12, whereas the bottom portion 29 of each of the concave portions 28 is connected to each of the small width portions of the top wall 12. In this state, the two side walls 14a and 14b are integrally provided with the back surface 17 of the top wall 12. In the present embodiment, widths of all of the protruded portions 27 of the convex portions 26 are made approximately equal and widths of all of the bottom portions 29 of the concave portions 28 are also made approximately equal, respectively. Further, the width of all of the protruded portions 27 of the convex portions 26 and the bottom portions 29 of the concave portions 28 are made approximately equal. However, the widths of the portions are not limited to be approximately equal as above.

Figure 2:
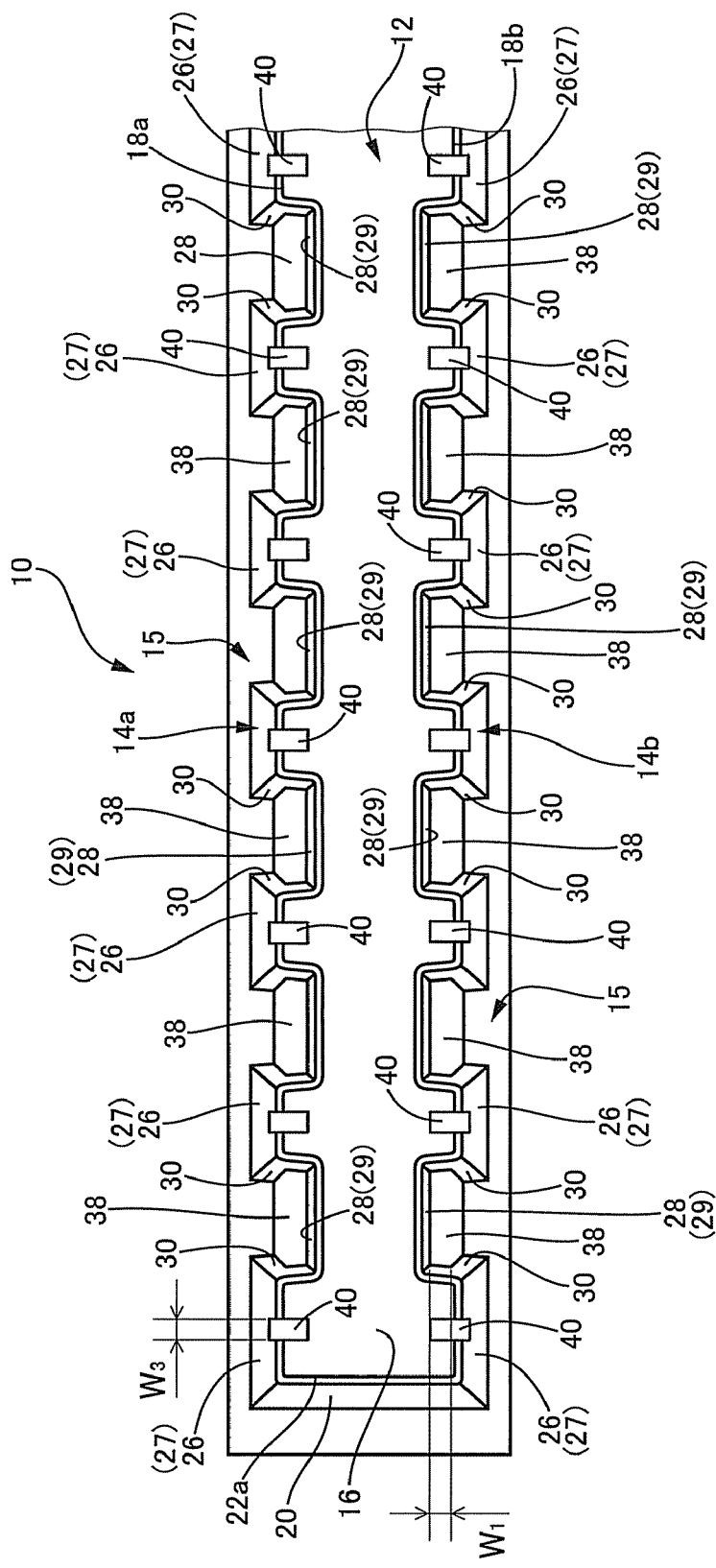
FIG. 2 is a partially enlarged plan view of the shock absorbing structure for a vehicle shown in FIG. 1.
Figure 3:
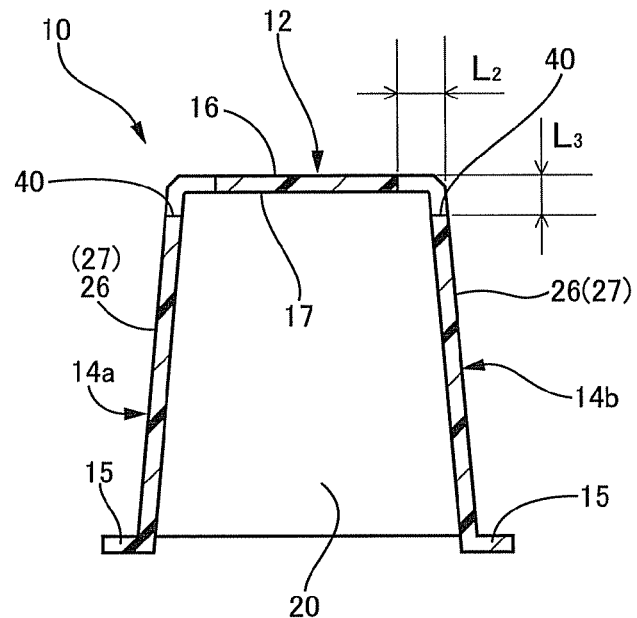
FIG. 3 is an enlarged cross sectional view taken along line III-III of FIG. 1.

In addition, in the present embodiment, as shown in FIGS. 2 and 3, in the state of being integrally provided with the back surface 17 of the top wall 12, the two side walls 14a and 14b, respectively, are inclined so as to be gradually spaced apart from each other as the side walls 14a and 14b extend from the top wall 12 toward the bottom plate 15.

Figure 4:
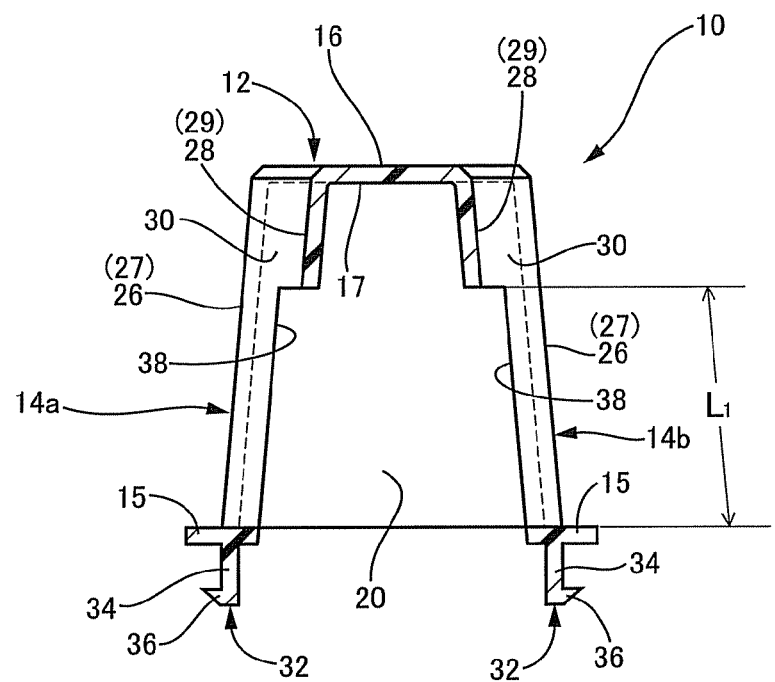
FIG. 4 is an enlarged cross sectional view taken along line IV-IV of FIG. 1.
Figure 5:
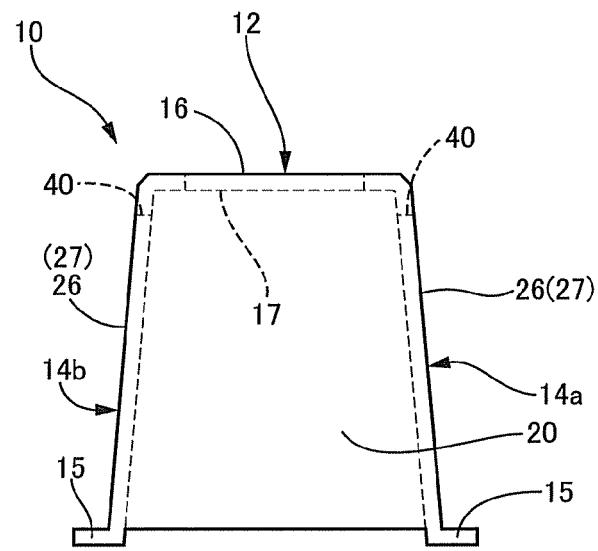
FIG. 5 is an enlarged view of an end face indicated by arrow V of FIG. 1.

Furthermore, as shown in FIGS. 1, 2, and 4, as the side portions 30 extend from the top wall 12 toward the bottom plate 15, both of the opposite side portions 30 of each of the concave portions 28 are inclined so that the side portions 30 are close to each other in the length direction of the side walls 14, and as the side portions 30 extend outwardly in the opposing directions of the two side walls 14a and 14b, the side portions 30 are gradually spaced apart from each other.

More specifically, in this manner, in the shock absorbing structure 10 of the present embodiment, the rectangular waveform that is formed by each of the two side walls 14a and 14b and that is extended in the direction perpendicular to the shock application direction is formed into a trapezoidal waveform. A cross section of the side walls 14 parallel to the shock application direction are formed into an angular U-shape in which a width of the cross section is gradually increased toward an opening portion in both areas where the convex portions 26 is formed and where the concave portions 28 is formed.

In addition, as shown in FIGS. 2 to 5, in the shock absorbing structure 10, at opposite end portions of the two side walls 14a and 14b in the length direction thereof, connecting walls 20 having a planar shape are integrally provided with the back surface 17 of the top wall 12. That is, the respective connecting walls 20 are extended from two short sides 22a and 22b, which are extended in the width direction of the top wall 12 (in the vertical direction in FIG. 2), toward the same direction as an extending direction of the side walls 14. Then, the two side walls 14a and 14b are connected each other at their opposite end portions in the length direction via the connecting walls 20. Both of the two connecting walls 20 have the same thickness as those of the top wall 12 and the side walls 14, and have entirely trapezoidal shape in which a width of an edge of each connecting wall 20 opposite from the top wall 12 side is made larger than a width of an edge on the top wall 12 side. In addition, the connecting walls 20 are inclined so as to gradually space apart from each other as the connecting walls extend from the top wall 12 toward the bottom plate 15.

Meanwhile, as is apparent from FIGS. 1 to 4, the bottom plate 15 is formed of a flat plate having a thickness approximately equal to that of the top wall 12 and that of the side walls 14a and 14b. Then, the bottom plate 15 is integrally provided with the edges of the side walls 14 opposite from the top wall 12 side such that the bottom plate 15 is protruded with a predetermined height outward in the opposing directions of the side walls 14 so as to have an outward flange shape continuously extending over an entire length in the length direction of the side walls 14.

On a back surface of the bottom plate 15 integrally formed with the side walls 14 (a surface thereof opposite from the top wall 12 side), engagement clips 32 as engaging portions are integrally provided at a plurality of positions (herein, eight positions) with a predetermined distance therebetween in the length direction of the bottom plate 15. Each of the engagement clips 32 has a planar supporting portion 34 and a claw portion 36. The engagement clip 32 is integrally formed with the back surface of the bottom plate 15 with a predetermined thickness and a predetermined height and is flexible or elastically deformable in a thickness direction thereof. The claw portion 36 has a triangle shape in cross section and is integrally formed with a surface of a tip of the supporting portion 34 opposite from a side where the side walls 14 are opposed to each other.

In the shock absorbing structure 10 of the present embodiment, particularly, every formation portion of the concave portion 28 on the side walls 14 has a first window 38 that straddle a part of the formation portion of the concave portion 28 and a portion of the bottom plate 15 connecting thereto. Further, every formation portion of the convex portion 26 on the side walls 14 has a second window 40 that straddle a part of the formation portion of the convex portion 26 and a portion of the top wall 12 connecting thereto.

Described more specifically, as is apparent from FIGS. 2 and 4, in the present embodiment, there are rectangularly cut off (removed) portions that include portions of every one of the concave portions 28 of the side walls 14 including more than half part of the bottom portion 29 from the bottom plate 15 side and more than half part of both of the side portions 30 from the bottom plate 15 side, and portions of the bottom plate 15 that are positioned between the opposite side portions 30 of every one of the concave portions 28 and positioned on the bottom portion 29 side. Then, at the above removed portions, the first windows 38 are formed so as to straddle the portions of the side walls 14 including the parts of the bottom portions 29 and the parts of the opposite side portions 30 of all the concave portions 28 and the portions of the bottom plate 15 that are connected to the bottom portions 29 of all the concave portions 28 and are positioned between the opposite side portions 30.

Figure 6:
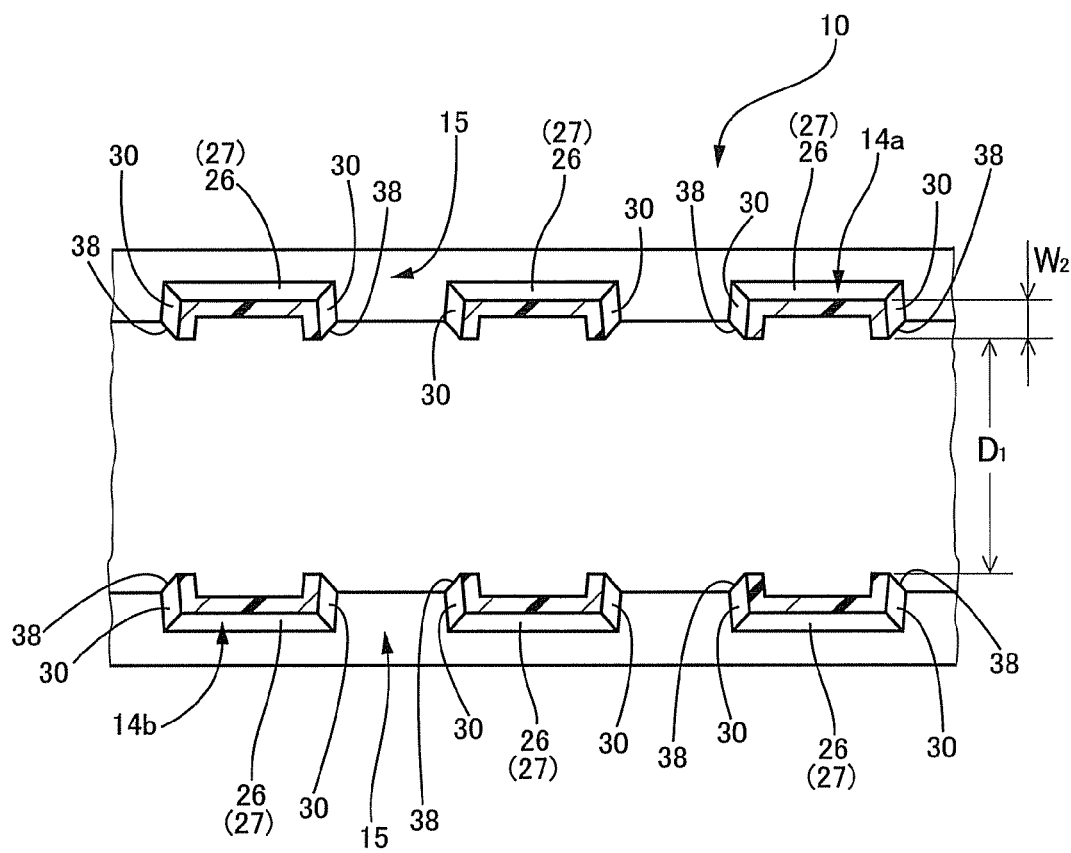
FIG. 6 is a partially enlarged cross sectional view taken along line VI-VI of FIG. 1.

As shown in FIG. 6, the bottom portion 29 of every one of the concave portions 28 is all cut off and removed in the cross section perpendicular to the shock application direction in the formation portions of the first windows 38 of the respective two side walls 14a and 14b. Additionally, in the opposing directions of the side walls 14, a distance $D_1$ between end faces of the side portions 30 on the bottom portions 29 side of the mutually opposing concave portions 28 is made sufficiently large.

Furthermore, in the present embodiment, an extending length $L_1$ (See FIG. 4) of each of the first windows 38 to a height direction of the side walls 14 is variously changed, whereby a size of the removed part of the bottom portion 29 of each concave portion 28 can be changed to any desired size. In addition, a width $W_1$ (See FIG. 2) of the part of the first window 38 provided in the side portion 30 of the each concave portion 28 is variously changed, whereby the distance $D_1$ between the end faces of the side portions 30 on the bottom portions 29 side of the mutually opposing concave portions 28 and a width $W_2$ (See FIG. 6) of the side portion 30 of the each concave portion 28 can be changed to any desired size. In this manner, the size of the first windows 38 can be appropriately changed, and thereby, entire deformation strength of the shock absorbing structure 10 can be easily adjusted to a desired level.

Additionally, as shown in FIGS. 2 and 3, end portions of the protruded portions 27 on the top wall 12 side in the all convex portions 26 of the side walls 14 are partly rectangularly removed at center portions in the length direction. Further, end portions at opposite sides in the width direction of the large width portions of the top wall 12, which is connected to the protruded portions 27 of the all convex portions 26, are partly rectangularly removed at center portions in the length direction. In short, in edge portions extending along the long side 18a and 18b of the top wall 12, there are removed the center portions in the length direction of the large width portions of the top wall 12. At the above removed portions, the second windows 40 are formed so as to straddle portions of the side walls 14 including parts of the protruded portions 27 of the all convex portion 26 and parts of the top wall 12 connected to the protruded portions 27.

Thus, in the shock absorbing structure 10 of the present embodiment, a section modulus of the vertical cross section as shown in FIG. 3 is made smaller at the center portion in the length direction of the large width portion of the top wall 12, at which the second window 40 is formed, than section modulus of vertical cross section of the other large width portions and the small width portions. Thereby, when a shock is applied to the top wall 12, the formation portions of the second windows 40 on the top wall 12 are relatively easily bent or curved so as to be recessed toward the bottom plate 15, thereby enabling an initial load to be reduced.

Furthermore, in the present embodiment, the size of the second window 40 is changed by appropriately adjusting an extending length $L_2$ (See FIG. 3) of the portion of each second window 40 formed on the top wall 12 along the width direction of the top wall 12, an extending length $L_3$ (See FIG. 3) of the portion of the second window 40 formed on the protruded portion 27 of the convex portion 26 along the height direction of the side wall 14, and a width $W_3$ (See FIG. 2) of the portion of the second window 40 formed on the top wall 12 and formed on the protruded portion 27 of the convex portion 26. Accordingly, the section modulus of the vertical cross section at the center portion in the length direction of the large width portion of the top wall 12, at which the second window 40 is formed, can be adjusted to any desired value. Additionally, by the adjustment of the section modulus as above, a maximum value of a shock load occurring at an initial stage of shock application to the shock absorbing structure 10, namely a maximum value of a shock load occurring within an effective stroke range of the side walls 14, can be easily controlled.

Figure 7:
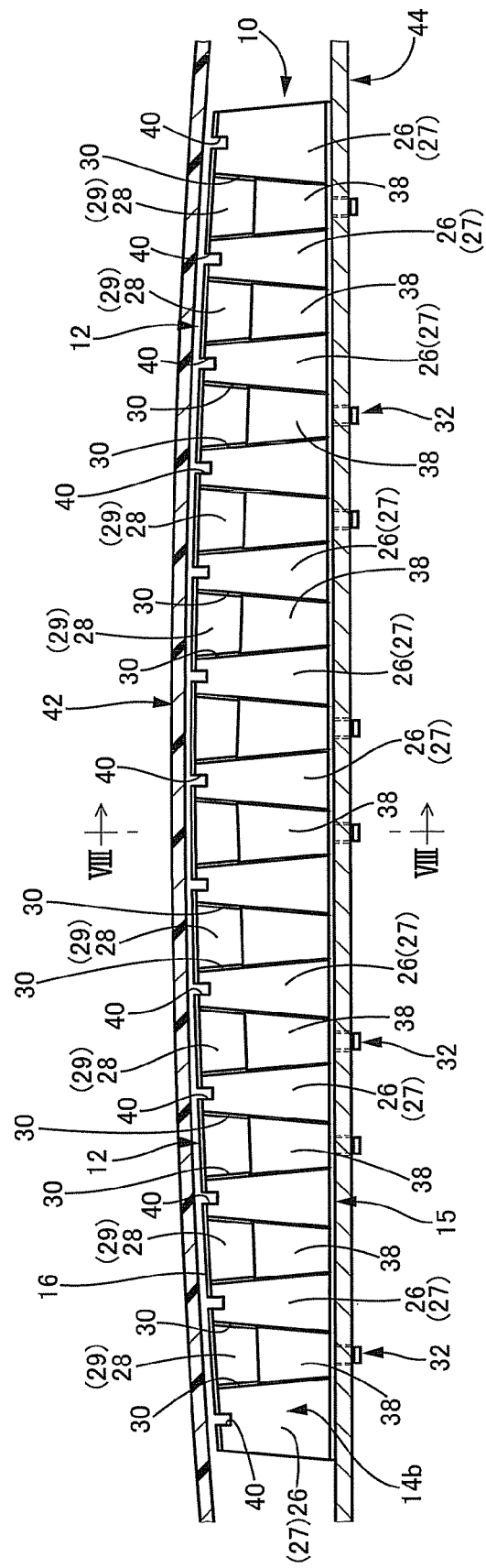
FIG. 7 is a vertical cross sectional view showing a state where the shock absorbing structure for a vehicle shown in FIG. 1 is installed inside a front bumper cover.
Figure 8:
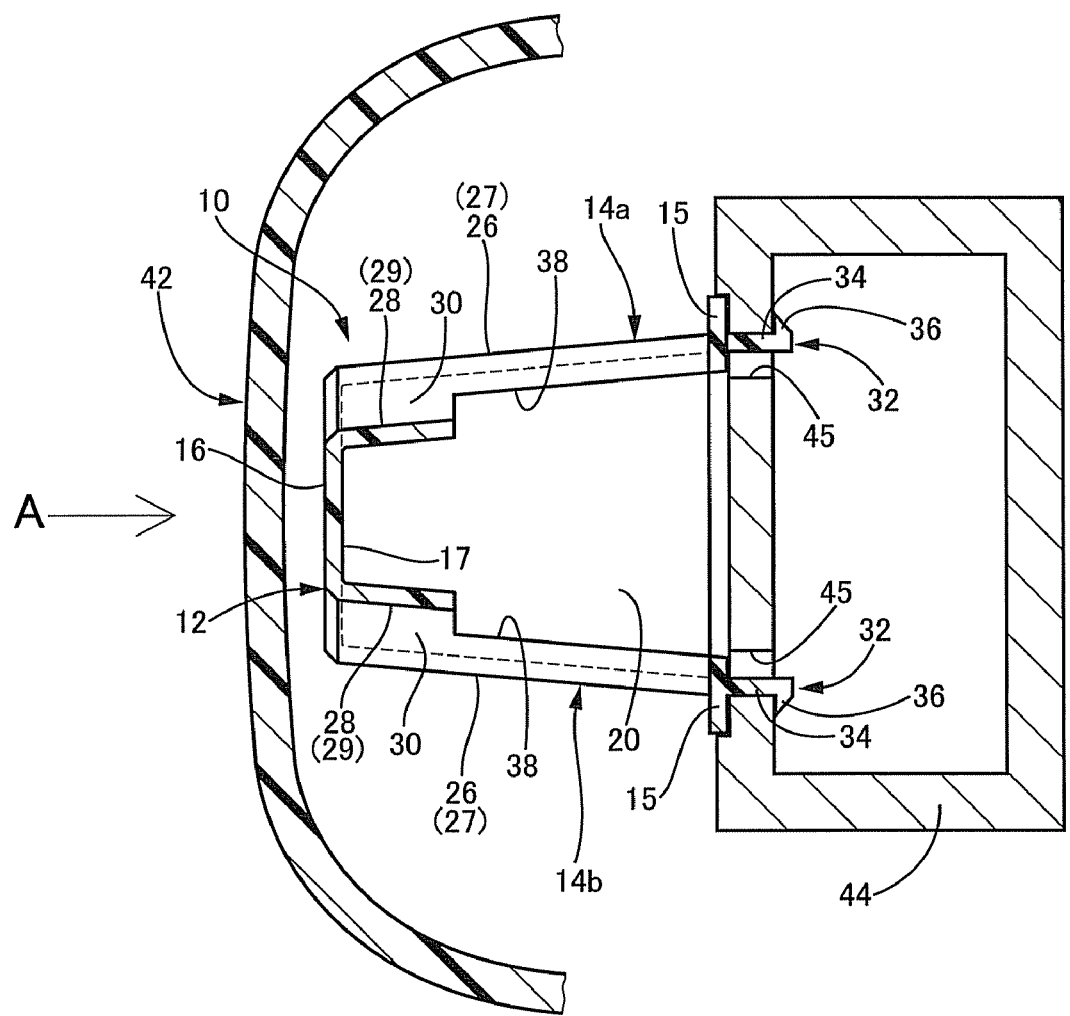
FIG. 8 is an enlarged cross sectional view taken along line VIII-VIII of FIG. 7.

For example, as shown in FIGS. 7 and 8, the shock absorbing structure 10 thus configured is installed between a bumper cover 42 of the front bumper and a bumper reinforcement 44 as a vehicle body component, that are disposed at the front part of an automobile body, such that the structure 10 extend in a length direction (a vehicle body width direction) of the bumper cover 42, and such that the shock applied surface 16 of the top wall 12 faces an inner surface of the bumper cover 42 with a predetermined distance therebetween and the bottom plate 15 is in contact with a surface of the bumper reinforcement 44 opposing the bumper cover 42. Further, in the above installation condition, the engagement clips 32 provided on the bottom plate 15 are inserted into insertion holes 45 provided in the bumper reinforcement 44 to be engaged with the bumper reinforcement 44 by the claw portions 36. Thereby, the shock absorbing structure 10 is fixed to the bumper reinforcement 44 in the state where the side walls 14 are extended in the shock application direction.

Thus, in the shock absorbing structure 10 of the present embodiment, for example, if a pedestrian or the like contacts or collides with the bumper cover 42 of the automobile while an automobile is running, a shock or impact generated by the contact or collision is applied to the top wall 12 of the shock absorbing structure 10 via the bumper cover 42 in the direction indicated by arrow A in FIG. 8. Thereby, the two side walls 14a and 14b of the shock absorbing structure 10 are sandwiched between the bumper cover 42 and the bumper reinforcement 44 to allow buckling deformation of the protruded portion 27 of the convex portion 26 and the bottom portion 29 of the concave portion 28 in each side wall 14 so as to absorb shock energy. As a result, the pedestrian and a vehicle passenger can be protected.

Each of the two side walls 14a and 14b of the shock absorbing structure 10 has the trapezoidal waveform which extends in the direction perpendicular to the shock application direction and in which the convex portions 26 and the concave portions 28 are alternately and continuously provided in the length direction (the vehicle body width direction). Accordingly, the each side wall 14 can maintain appropriate deformation strength, although the side wall 14 is relatively thin in thickness and relatively small in height. Thereby, while ensuring weight reduction, the shock absorbing structure 10 is capable of favorably absorbing a sufficient amount of shock energy.

Furthermore, in the present embodiment, particularly, the first windows 38 are provided in all of the formation portions of the concave portions 28 on the each side wall 14 to remove the more than half part of the bottom portion 29 of each concave portion 28. Further, the distances $D_1$ between the end faces on the bottom portions 29 side of the side portions 30 of the concave portions 28 mutually opposing in the opposing directions of the side walls 14 are all made sufficiently large.

Thus, in the shock absorbing structure 10 of the present embodiment, although a distance between the bottom portions 29 of the concave portions 28 located at opposite sides in the opposing directions of the side walls 14 is made smaller than a distance between the protruded portions 27 of the convex portions 26 located at the opposite sides in the opposing directions of the side walls 14, when application of a shock causes the bottom portions 29 of the concave portions 28 of the side walls 14 to be buckled and deformed together with the protruded portions 27 of the convex portions 26, it can be effectively prevented that easy contact is occurred between the bottom portions 29 of the concave portions 28 located at the opposite sides in the opposing directions of the side walls 14 and easy contact is occurred between the end faces of the side portions 30 on the bottom portions 29 side. Consequently, the side walls 14 can stably maintain a sufficient shock stroke.

Moreover, in the shock absorbing structure 10 above, the extending length $L_1$ of the first windows 38 in the height direction of the side walls 14 and the width $W_1$ of the portions of the first windows 38 provided in the side portions 30 of the concave portions 28 are appropriately changed to adjust the size of the first windows 38, thereby enabling the deformation strength of the shock absorbing structure 10 to be changed. Accordingly, without changing the thickness of the side walls 14, the heights and the depths of the convex and the concave portions 26 and 28 and the like, a load value of load displacement characteristics can be favorably increased or reduced simply by changing the size of the first windows 38. Therefore, upon tuning of the load displacement characteristics, modification of a mold die for the shock absorbing structure 10 can be made in a sufficiently small scale as compared to tuning of the load displacement characteristics that is conducted by changing the thickness of the side walls 14, the heights and the depths of the convex and the concave portions 26 and 28, and the like, for example. This can favorably reduce a cost required for tuning the load displacement characteristics.

In the present embodiment, additionally, adjacent ones of the convex portions 26 of the side walls 14 are connected to each other by the bottom plate 15. This can favorably prevent excessive reduction of the entire deformation strength of the side walls 14 caused by formation of the first windows 38. Furthermore, there are removed the end portions of the bottom plate 15 on the bottom portions 29 side, which is adjacent to the bottom portions 29 of the concave portions 28. Thereby, undercut portions are removed upon molding of the shock absorbing structure 10 as the resin molded body, thereby facilitating mold releasing, and ultimately facilitating molding of the shock absorbing structure 10.

Therefore, the shock absorbing structure 10 of the present embodiment formed as above can stably ensure a sufficient shock stroke, and also can easily and surely tune the load displacement characteristics at a lowest possible cost. As a result, the shock absorbing structure 10 can very effectively provide more excellent shock absorbing characteristics that is appropriate to a magnitude of a shock generated by a collision and differences between objects that should be protected from the shock, for example.

In addition, in the shock absorbing structure 10, the first windows 38 are provided in every formation portion of the concave portions 28 of the side walls 14. This allows an area where deformation strength is reduced by formation of the first windows 38 to be equalized in the length direction of the side walls 14, which favorably suppresses a difference in the load displacement characteristics due to a difference between shock applied positions on the side walls 14, thereby effectively ensuring stable shock absorbing characteristics.

Furthermore, in the present embodiment, the second windows 40 are formed to straddle the center portions in the length direction of every one of the large width portions of the top wall 12 and the end portions of the protruded portions 27 of the convex portions 26 on the top wall 12 side. The end portion of the protruded portions 27 of the side walls 14 is connected to the center portion of the large width portions of the top wall 12. As a result, the section modulus of the vertical cross section at the formation portions of the second windows 40 is made small and the maximum value of an initial load imposed when a shock is applied to the top wall 12 is reduced.

In addition, in the present embodiment, the size of the second window can be appropriately adjusted by changing the extending length $L_2$ of the portions of the second windows 40 formed in the top wall 12, the extending length $L_3$ of the portions of the second windows 40 formed in the protruded portions 27 of the convex portions 26, and the width $W_3$ of the portions of the second windows 40 formed in the top wall 12 and the protruded portions 27 of the convex portions 26. This can change the magnitude of the initial load imposed when the shock is applied to the top wall 12. Accordingly, for example, without changing the thicknesses and the like of the top wall 12 and the side walls 14, the magnitude of the initial load imposed by the shock applied to the top wall 12 can be easily changed at a low cost by simply changing the size of the second windows 40, in which modifications of the mold die for the shock absorbing structure 10 can be small.

In the shock absorbing structure 10 of the present embodiment, each of the side walls 14 has the rectangular waveform. Accordingly, for example, unlike the side wall 14 that have a waveform in which convex portions having curved protruded portions and concave portions having curved bottom portions are alternately and continuously provided, a presence of corners in the shape can favorably increase the deformation strength of the side wall 14. Thereby, although the height of the side wall 14 is rather small, a sufficient shock stroke can be stably maintained.

Furthermore, in the shock absorbing structure 10, the two side walls 14a and 14b are inclined so as to be gradually spaced apart from each other as the side walls 14a and 14b extend from the top wall 12. Further, the opposite side portions 30 of the concave portion 28 of each side wall 14 are also inclined so as to be closer to each other in the length direction of the side wall 14 as the side portions 30 extend from the top wall 12. Furthermore, the side portions 30 are inclined so as to be spaced apart from each other outwardly in the opposing directions of the two side walls 14a and 14b as the side portions 30 extend from the top wall 12. Thereby, in buckling deformation of the two side walls 14a and 14b of the shock absorbing structure 10, mutual contact and interference between the deformed side walls 14 can be maximally prevented. Consequently, an effective stroke of each side wall 14 can be sufficiently maintained. In addition, the shock absorbing structure 10 can be formed into a configuration free from undercut portions, thus facilitating molding of the structure.

Furthermore, when the shock absorbing structure 10 of the present embodiment is installed between the bumper cover 42 and the bumper reinforcement 44, the end portions of the side walls 14 each having a smaller height and the connecting wall 20 connecting those end portions are arranged inside the bumper cover 42 so as to be positioned at opposite ends in the vehicle body width direction, respectively. Accordingly, even when a shock is applied to the above portions of the bumper cover 42, the end portions of the side walls 14 and the connecting wall 20 connecting the end portions thereof are buckled and deformed together, thereby enabling shock energy to be sufficiently absorbed, despite the smaller heights of the end portions of the side walls 14 which are positioned corresponding to the above portions of the bumper cover 42.

Moreover, in the present embodiment, the shock absorbing structure 10 can be fitted into the bumper reinforcement 44 by a one-touch simple operation in which the engagement clips 32 integrally formed with the back surface of the bottom plate 15 connected to the side walls 14 are simply inserted into the insertion holes 45 of the bumper reinforcement 44. Accordingly, the shock absorbing structure 10 can be easily installed in the vehicle body. Additionally, the engagement clips 32, which are provided on the back surface of the bottom plate 15, do not inhibit deformation of the side walls 14 caused by a application of shock, thus favorably ensuring stable shock absorbing characteristics.

While the preferred embodiment of the present invention has been described in detail, for illustrative purpose only, it is to be understood that the present invention is not limited to the details of the illustrated embodiments.

Figure 9:
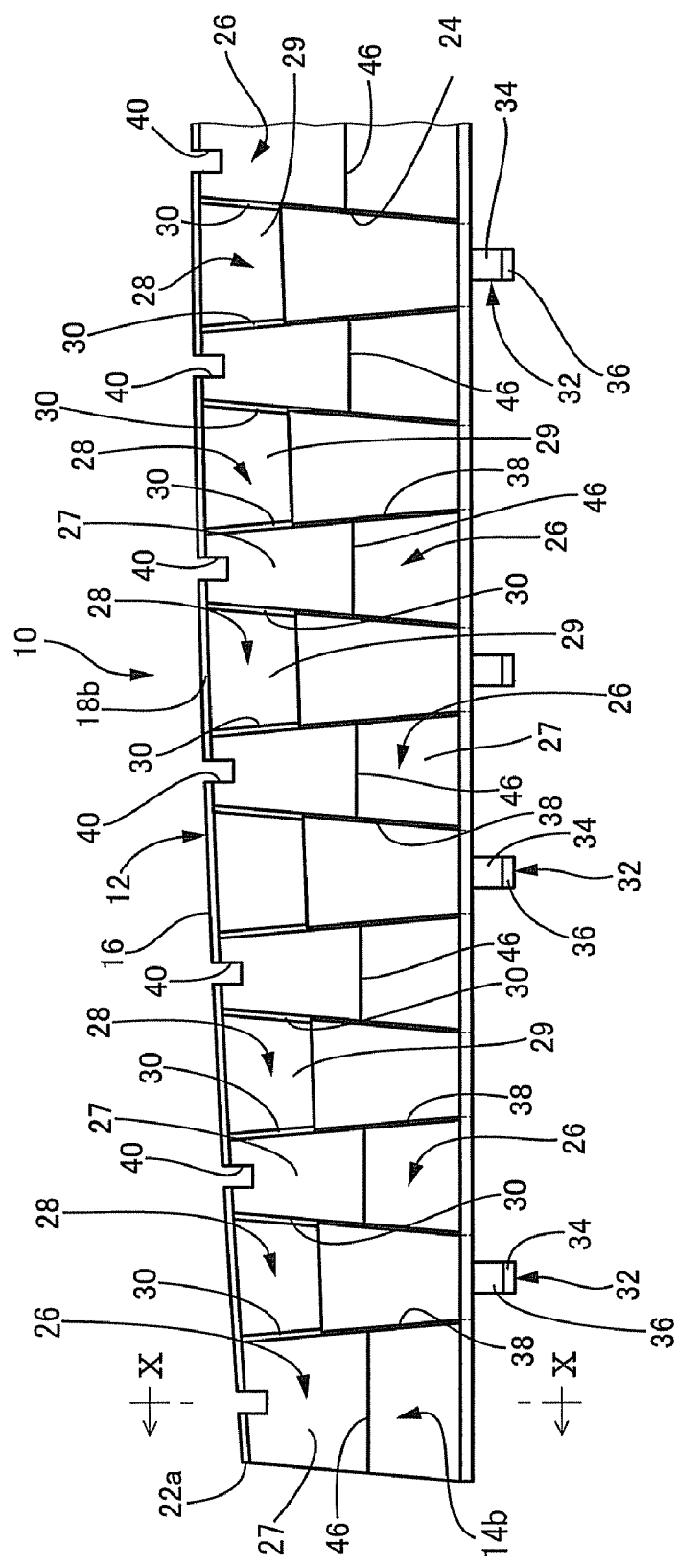
FIG. 9 is a partial front view of a shock absorbing structure for a vehicle according to another embodiment of the present invention.
Figure 10:
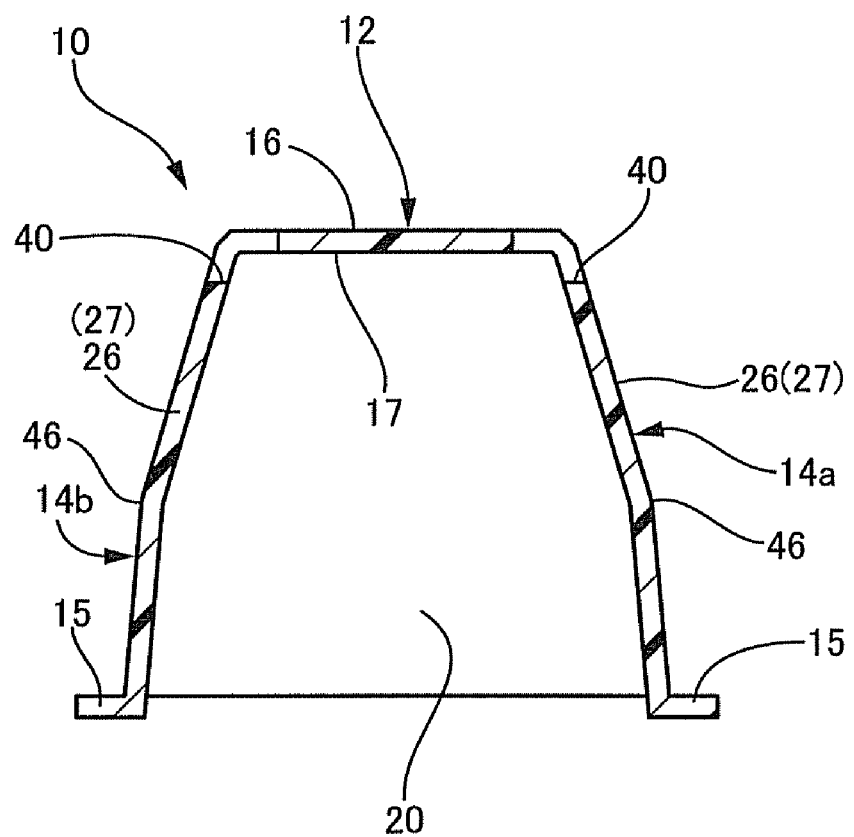
FIG. 10 is an enlarged cross sectional view taken along line X-X of FIG. 9.

For example, as shown in FIGS. 9 and 10, bending portions 46 may be provided at middle in the shock application direction (the height direction of the side walls 14) of the protruded portions 27 of all the convex portions 26 of the side walls 14, which correspond to the formation portions of the first windows 38 of the adjacent concave portions 28 in the length direction of the side walls 14. The bending portions 46 may be bent in a dog-legged shape at an obtuse angle so as to be protruded outwardly in the mutually opposing directions of the two side walls 14a and 14b.

In the shock absorbing structure 10 including the bending portions 46 formed on the protruded portions 27 of the convex portions 26, when a shock is applied, the protruded portions 27 of the convex portions 26 of the side walls 14, and ultimately the two side walls 14a and 14b can be buckled and deformed outwardly in the opposing directions of the side walls 14. This can maximally prevent mutual contact and interference between the side walls 14 deformed by the applied shock, thereby enabling the effective stroke of the side walls 14 to be more sufficiently maintained.

Figure 11:
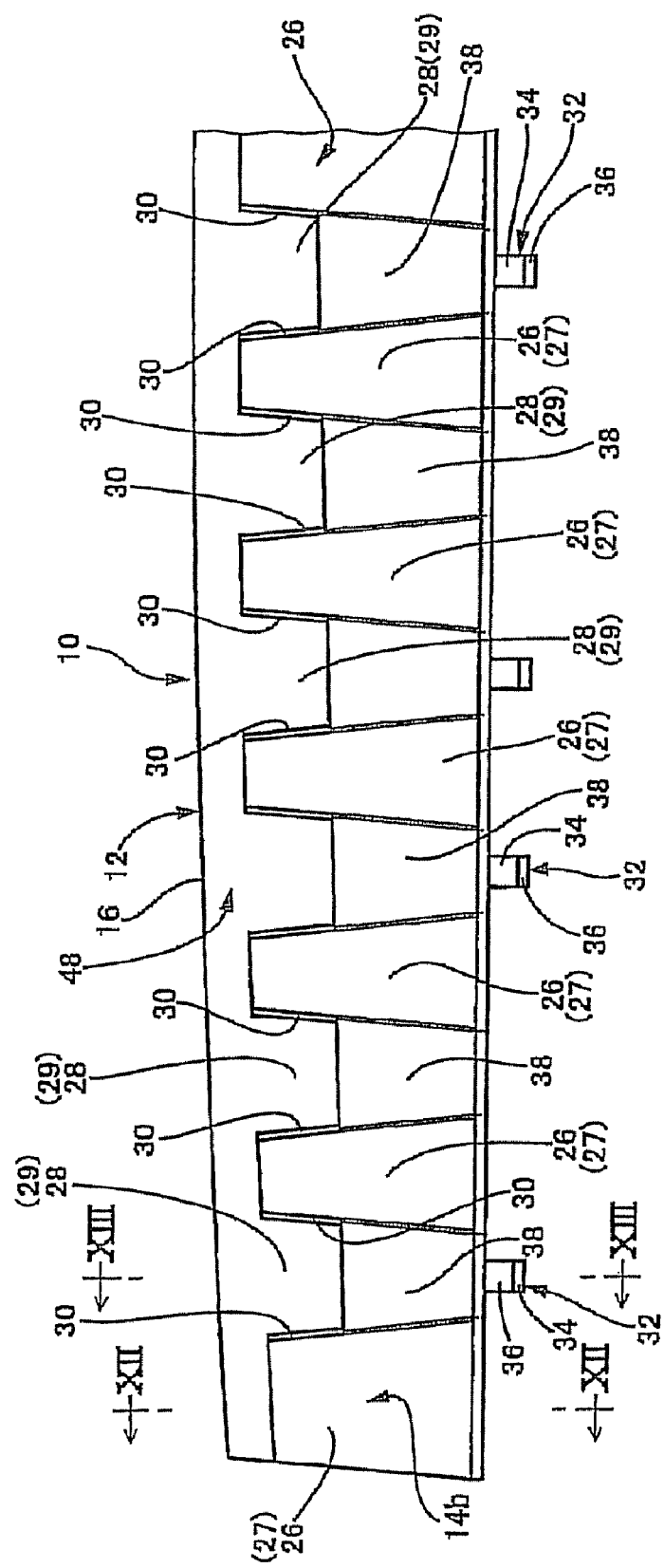
FIG. 11 is a partial front view of a shock absorbing structure for a vehicle according to still another embodiment of the present invention.
Figure 12:
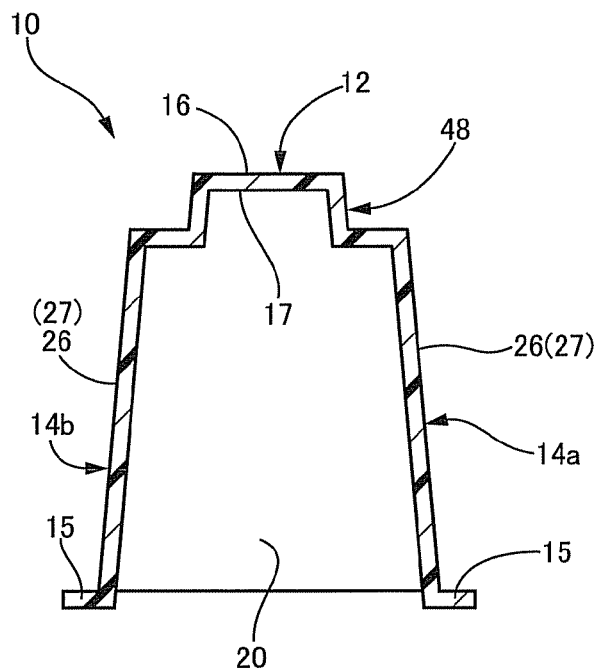
FIG. 12 is an enlarged cross sectional view taken along line XII-XII of FIG. 11.
Figure 13:
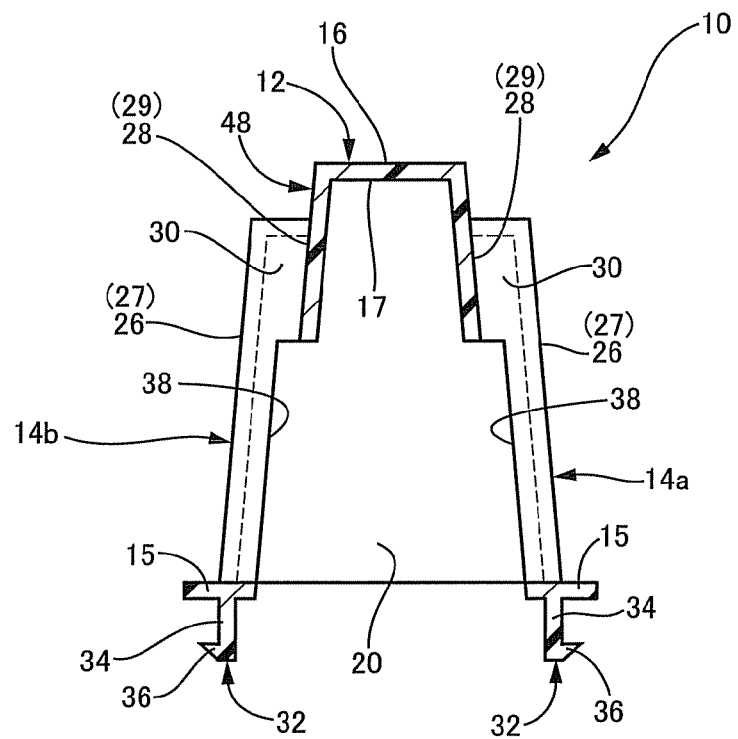
FIG. 13 is an enlarged cross sectional view taken along line XIII-XIII of FIG. 11.

In addition, as shown in FIGS. 11 to 13, the end portion of each side wall 14 on the top wall 12 side may be formed as a flat planar portion 48, and the top wall 12 may have a narrow elongate rectangular shape with a constant width over an entire length in the length direction thereof. In other words, the convex portions 26 and the concave portions 28 may be alternately and continuously provided only on the bottom plate 15 side of the each side wall 14, not on the planar portion 48 of the side walls 14.

Unlike the top wall 12 having the long, narrow, and stepped rectangular shape formed by alternately and continuously providing the small width portions and the large width portions, the top wall 12 of the above shock absorbing structure 10 has the constant width. As a result, the deformation strength of the structure in the length direction of the top wall 12 can be favorably equalized. In this manner, the difference in load displacement characteristics due to the difference between shock applied positions can be favorably suppressed, thereby enabling collision position dependence of the shock absorbing characteristics to be effectively eliminated.

Furthermore, the first windows 38 and the second windows 40 do not necessarily have to be provided in every formation portion of the concave portions 28 and the convex portions 26 of the side walls 14. For example, in accordance with desired load displacement characteristics or the like, the first and the second windows 38 and 40 may be formed only in one or some portion(s) appropriately selected from all of the formation portions of the concave portions 28 and the convex portions 26 of the side walls 14.

The bending portions 46, which are provided on the protruded portions 27 of the convex portions 26 of the side walls 14, also may be formed only on one or some portion(s) appropriately selected from the protruded portions 27 of all of the convex portions 26.

In the above embodiment, the heights (the widths) of the respective side walls 14 are gradually increased (widened) toward the center portion in the length direction. Alternatively, the side walls may have constant heights (widths) over the entire length.

Still furthermore, the thickness of the top wall 12, the two side walls 14a and 14b, and the bottom plate 15 do not necessarily have to be the same. Further, each of the top wall 12, the side walls 14a and 14b, and the bottom plate 15 may include a part having a different thickness.

Of the two connecting walls 20, which connect one end portions in the length direction of the two side walls 14a and 14b and the other end portions, respectively, at least one of the connecting walls 20 may be omitted. Then, at the end portions in the length direction of the two side walls 14a and 14b where the at least one of the connecting walls 20 is omitted, there may be provided a thin planar reinforcement rib having a gate-like shape as a whole that is circumferentially extended over the opposing surfaces of the side walls 14a and 14b and the back surface 17 of the top wall 12. In addition, it is obvious that the connecting wall 20 and the reinforcement rib may be both omitted.

An installation structure of the shock absorbing structure 10 to the bumper reinforcement 44 is not specifically limited to the above exemplification.

A maximum width and a minimum width of the convex portions 26 and the concave portions 28 provided on the side walls 14 (a maximum value and a minimum value of sizes in the length direction of the side walls 14) do not necessarily have to be uniform among the convex portions 26 and among the concave portions 28.

The side walls 14 may be formed into any waveform in addition to a rectangular waveform. Examples of such a waveform include a curved waveform in which convex curved portions and concave curved portions are alternately and continuously provided.

The two side walls 14a and 14b may be integrally formed with the top wall 12 such that the side walls are extended in parallel to each other in the shock application direction.

Both of the side portions 30 of the each concave portion 28 may be extended in parallel to each other.

The shape, the size, and the like of the top wall 12 may be variously changed in accordance with an area where the shock absorbing structure 10 is to be installed in the vehicle body, and the like.

The shock absorbing structure 10 may include a plurality of shock absorbing structures, and they may be combined to be installed on an installation area of the vehicle body.

In addition to such a shock absorbing structure installed inside the front bumper of an automobile, the present invention can be favorably applied to any shock absorbing structure installed on a back side or the like of an exterior or interior part of an automobile other than a front bumper, and shock absorbing structures installed in vehicles other than automobiles.

Although further details will not be given herein, it is to be understood that the present invention may be embodied with various other changes and modifications which may occur to those skilled in the art, without departing from the spirit and scope of the invention.

What is claimed is:

1. A shock absorbing structure for a vehicle comprising a resin molded body having an angular U-shaped cross section parallel to a shock application direction, the resin molded body comprising: a top wall to which a shock is to be applied; two side walls formed integrally with the top wall such that the side walls extend in a shock application direction from a back surface of the top wall opposite to a surface on which the shock is applied and are opposed to each other, each side wall being formed into a waveform in which a plurality of convex portions protruding outwardly in opposing directions of the side walls and a plurality of concave portions recessed inwardly in the opposing directions of the side walls are alternately and continuously formed in a length direction of each side wall; and a bottom plate extending in the length direction of the side walls perpendicular to the shock application direction and having an outer flange shape protruding outwardly in the opposing directions of the side walls, the bottom plate being integrally formed with an end portion of each side wall which is opposite to an end portion on the top wall side, wherein a first window portion is provided on at least one formation portion of the concave portion of the side walls, the first window portion extending over a portion of each side walls including a part of a bottom portion and parts of both side portions of the concave portion and extending down to a portion of the bottom plate that is connected to the bottom portion and that is positioned between the side portions.

2. The shock absorbing structure for a vehicle according to claim 1, wherein each of the plurality of convex portions has a bending portion at a middle of a protruded portion thereof in the shock application direction and the bending portion protrudes outwardly in the opposing directions of the side walls.

3. The shock absorbing structure for a vehicle according to claim 1, wherein a second window portion is provided on at least one formation portion of the convex portion of the side walls, the second window portion extending over a part of a protruded portion of the convex portion and a portion of the top wall connected to the protruded portion.

4. The shock absorbing structure for a vehicle according to claim 1, wherein each of the side walls is a plate having a plurality of projected portions that project outwardly in the opposing directions of the side walls and extend from the bottom plate toward the top wall with a predetermined length which is not enough to reach the top wall, thereby forming a planar portion on the top wall side of the side walls, the plurality of projected portions being spaced apart from each other with a predetermined distance therebetween in the length direction of the side wall, and wherein the plurality of projected portions consist the plurality of convex portions and portions of the plate member positioned between the plurality of projected portions consist the plurality of concave portions, whereby a width of the top wall is constant over the entire length thereof in the length direction.

5. The shock absorbing structure for a vehicle according to claim 1, wherein each of the side wall is formed into a rectangular waveform.

6. The shock absorbing structure for a vehicle according to claim 1, wherein the two side walls are respectively inclined away from each other outwardly in the opposing directions of the side walls as the side walls extend from the top wall toward the bottom plate.

7. The shock absorbing structure for a vehicle according to claim 1, wherein the side portions of each of the plurality of concave portions are respectively inclined away from each other in the length direction of the side wall as the side portions extend from the top wall toward the bottom plate.

8. The shock absorbing structure for a vehicle according to claim 1, wherein the side portions of each of the plurality of concave portions are respectively inclined toward each other in the length direction of the side wall as the side portions extend from the top wall toward the bottom plate.

9. The shock absorbing structure for a vehicle according to claim 1, wherein the side portions of each of the plurality of concave portions are respectively inclined away from each other outwardly in the opposing directions of the side walls, whereby each of the side walls defines a trapezoid waveform.

10. The shock absorbing structure for a vehicle according to claim 1, wherein the side portions of each of the plurality of concave portions are respectively inclined toward each other inwardly in the opposing directions of the side walls, whereby each of the side walls defines a trapezoid waveform.

11. The shock absorbing structure for a vehicle according to claim 1, wherein the two side walls are integrally connected each other at their opposite ends in the length direction via at least one connecting wall integrally provided with the top wall.

12. The shock absorbing structure for a vehicle according to claim 1, further comprising a plurality of engagement clips integrally formed with the back surface of the bottom plate, the plurality of engagement clips being inserted into a plurality of insertion holes provided in a vehicle body component to fix the shock absorbing structure to the vehicle body component.

* * * * *